United States Patent [19]

Leiber

[11] Patent Number: 4,466,458

[45] Date of Patent: Aug. 21, 1984

[54] CONTROL VALVE

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 415,948

[22] Filed: Sep. 8, 1982

[30] Foreign Application Priority Data

Apr. 28, 1982 [DE] Fed. Rep. of Germany ....... 3215740

[51] Int. Cl.³ .................... F16K 11/10; F16K 31/124
[52] U.S. Cl. ................................ 137/606; 137/627.5;
137/596.1; 251/25; 91/5; 91/29
[58] Field of Search ................... 251/25, 26, 28, 30;
91/29, 28, 9, 446, 5; 137/596.1, 606, 627.5;
60/412, 416

[56] References Cited

U.S. PATENT DOCUMENTS 787,347 4/1905 Templin ............................. 251/25
3,038,500 6/1962 Lansky et al. ...................... 251/30

Primary Examiner—Martin P. Schwadron
Assistant Examiner—John S. Starsiak, Jr.
Attorney, Agent, or Firm—Edwin E. Greigg

[57] ABSTRACT

A control valve for the application of a desired pressure in a working circuit, having a pressure chamber connected with a pressure source, a control chamber separated during the rest position of the valve from the pressure chamber by a first seat valve which connects with a working circuit and a pressureless connection during the rest position of the valve, and finally the control valve has an activating piston 14, by means of which, when the control valve is operated, first the connection between the control chamber and the pressureless connection is interrupted and then the first seat valve is opened. Additionally, a further seat valve is interposed into the connection between the pressure source and the pressure chamber, and a control piston 7 is provided to open seat valve 6 when exposed on the one side to the pressure in the pressure chamber 9 and on the other side to the pressure applied in the working circuit. The surface of the control piston exposed to the pressure in the pressure chamber is, in contrast to its surface exposed to the pressure in the working circuit, dimensioned so much smaller and/or the spring 11, acting on the piston and supporting the pressure in the working circuit is dimensioned in such a way, that this further seat valve, on the one hand, is closed during a state of no-pressure in the working circuit, however, on the other hand, during the opening of the first seat valve and the increase of pressure in the working circuit connected therewith, the control piston is displaced in such a manner that the further seat valve is opened.

3 Claims, 1 Drawing Figure

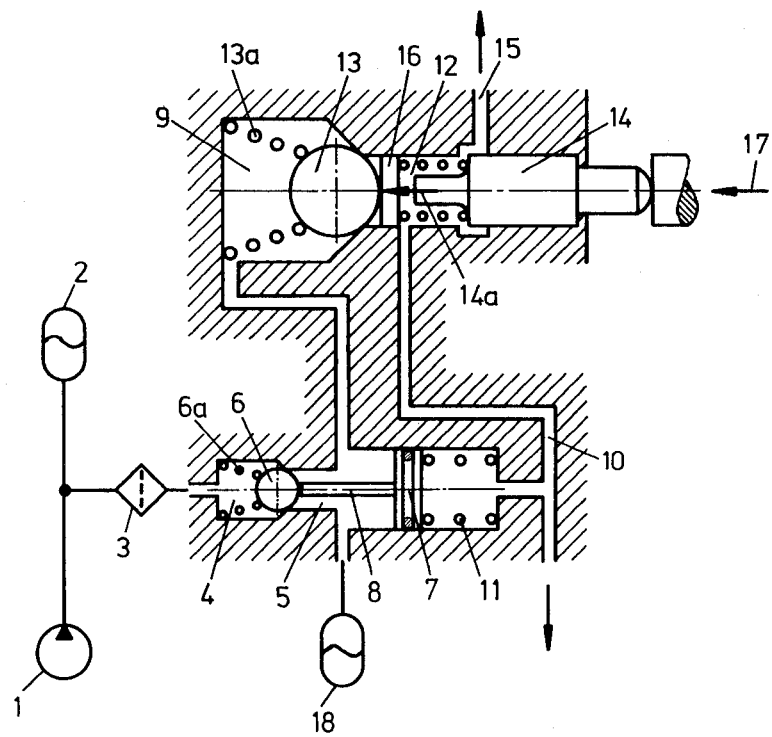

CONTROL VALVE

BACKGROUND OF THE INVENTION

A control valve for the application of a desired pressure in a work circuit, having a pressure chamber connected with a pressure source, a control chamber separated during the rest position of the valve from the pressure chamber by a first seat valve and connected to the work circuit and also connected to a pressureless connection during the rest position of the valve, and finally the control valve having an activating piston, by means of which, when the control valve is operated, first the connection between the control chamber and the pressureless connection is interrupted and then the first seat valve is opened.

Such a control valve is, for instance, known from German Offenlegungsschrift No. 25 31 264, FIG. 1 (reference numerals 9–17). There is a part of a main brake cylinder for dual-circuit brakes and serves to apply brake pressure to a brake circuit. Such brake systems are also called full power systems.

Control valves of the kind described above are also called proportional valves. They can be used, besides control of brake pressure, in other fields, as for instance as control valves for the regulation of levels or in power steering in motor vehicles.

Such control valves have the advantage over control valves developed as pure slide valves in that leakage is less and less demand is made on precision in manufacturing, however they show the so-called opening jump when the seat valve, which is under pressure only on one side from the pressure source, is opened.

OBJECT AND SUMMARY OF THE INVENTION

The object of the present invention is to alleviate this unwanted opening jump effect with small effort.

The embodiment in accordance with the present invention can be used for the control of a hydraulic pressure medium but also for a pneumatic pressure medium. Especially for the control of a hydraulic pressure medium it would be advantageous to connect to the pressure chamber a pressure reservoir which need only have a small stored volume (e.g. one or just a few cm$^3$). The release of its pressure when opening the first seat valve causes the displacement of the control piston and the opening of the second seat valve.

The transitional behavior of the system can be improved, i.e. the build-up of pressure in the working circuit without an opening jump, by disposing behind the first seat valve a throttle, preferably a valve disc having indentations around its periphery.

The invention will be better understood and further objects and advantages thereof will become more apparent from the ensuing detailed description of a preferred embodiment taken in conjunction with the drawings.

BRIEF DESCRIPTION OF THE DRAWINGS

A primary exemplary embodiment of the present invention is described by means of the drawing. It should be noted that in this exemplary embodiment both seat valves and their activating elements are housed in a block. Although this appears to be advantageous it is not a prerequisite.

DESCRIPTION OF THE PREFERRED EMBODIMENT

In the drawing, 1 denotes a pump and 2 a reservoir. They represent the pressure source of the system, connected by way of a filter 3 with a chamber 4. In the drawing the chamber 4 is separated from the chamber 5 by a seat valve 6, the spring 6a of which assures closing. In chamber 5 a slidable control piston 7 is disposed, which can open the seat valve 6 via a plunger 8. The pressure prevailing in the chamber 5 acts on one surface of the control piston 7 and provides fluid in the pressure chamber 9, while the pressure prevailing in a line 10 leading to chamber 12 and the working circuit, and a spring 11 act on the outer surface of the control piston 7.

The pressure chamber 9 is separated from a control chamber 12 by a seat valve consisting of ball 13 and spring 13a. In the position shown in the drawing of a brake activating piston 14, the control chamber 12 and, with it the line 10 and the working circuit are connected with a pressureless return line 15. In the connection closed by the ball 13 a valve disc 16 is disposed, having indentations around its periphery. A small spring reservoir 18 is connected with the chambers 5 and 9.

As already stated, in the valve position shown in the drawing the working circuit, e.g. a brake, is without pressure. If an activating force is brought to bear on the control piston 14 in the direction of the arrow 17, the piston 14 first closes the return line 15 and then opens the seat valve 13/13a by means of the plunger 14a. With this the pressure present between the seat valves 6/6a and 13/13a in the chambers 5 and 9 and in the reservoir 18, which is about equal to the pressure of the pressure source $\frac{1}{2}$, can relax. Also, at the same time the pressure in the chamber 12 and the working circuit connected to line 10 increases. The working faces of the piston 7 and the spring 11 are dimensioned such that, as long as there is no pressure in the line 10, the piston 7 cannot open the seat valve 6/6a. However, if the pressure is equalized when opening the seat valve 13/13a, the differences between the working surfaces of the piston 7 and/or the spring 11 cause the piston 7 to be displaced towards the left and the seat valve 6/6a to be opened. The opening jump is here split into two successive moments, furthermore, the piston 7 repeatedly opens and closes valve 6 during the pressure increase in the working circuit which also distributes the pressure increase over time and avoids a pronounced jump. The valve 6/6a and the piston 7 here act as a pressure regulator. The valve disc 16 also aids in the avoidance of a pressure jump by diminishing the degree of the pressure increase in the chamber 12 during the opening of the seat valve 13/13a.

If, conversely, the activating force 17 is removed, the seat valve 13/13a closes first and then the connection to the line 15 is opened. Pressure is reduced thereby in the chamber 12, the line 10 and in the working circuit. Thus, the piston 7 is displaced toward the right and closes the seat valve 6/6a. The pressure of the pressure source $\frac{1}{2}$ therefore is stored between the seat valves 6/6a and 13/13a and in the reservoir 18.

A fluid supply and a pressure relief line for the pump pressure source which are well known in the art are provided but not shown for simplification of the drawing.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A control valve system for the application of a desired pressure in a working circuit, which comprises: a pressure chamber connected with a first pressure source, a control chamber, a working circuit and a pressureless connection connected to said control chamber, a first seat valve which separates said pressure chamber from said control chamber, an activating piston positioned relative to said first seat valve for opening said seat valve and for closing off said pressureless connection during operation of said activating piston, a second pressure source, a second seat valve interposed between said second pressure source and a connection with said pressure chamber, a control piston positioned relative to said second seat valve for opening said second seat valve during operation of said control valve system for applying a pressure in the working circuit, said control piston being exposed to a pressure of said first pressure source on one face thereof and to a force spring on another face thereof, whereby activation of said activating piston closes off said pressureless connection and opens said first seat valve to apply pressure from said first pressure source to said working circuit and to said force spring face of said control piston which is exposed to the pressure in the pressure chamber subsequent to opening of said first control valve, the pressure in the pressure chamber is applied to the working circuit and acts on the control piston to open said second seat valve which applies pressure from said second pressure source to the working circuit, through said first seat valve which is now open, release of said activating piston closes said first seat valve, and opens said pressureless connection to relieve said working circuit of pressure thereby relieving pressure on the control piston which permits said second seat valve to close.

2. A control valve in accordance with claim 1, wherein said first pressure source is a small pressure reservoir connected to said pressure chamber.

3. A control valve as set forth in claim 1 or 2 which includes a throttle interposed between said first seat valve and said activating piston.

* * * * *